US006652252B2

(12) United States Patent
Zabar (10) Patent No.: US 6,652,252 B2
(45) Date of Patent: Nov. 25, 2003

(54) ELECTROMAGNETIC DEVICE PARTICULARLY USEFUL AS A VIBRATOR FOR A FLUID PUMP

(75) Inventor: Nachum Zabar, Ganei Tikva (IL)

(73) Assignee: MNDE Technologies L.L.C., White Plains, NY (US)

( * ) Notice: Subject to any disclaimer, the term of this patent is extended or adjusted under 35 U.S.C. 154(b) by 0 days.

(21) Appl. No.: 10/108,518

(22) Filed: Mar. 29, 2002

(65) Prior Publication Data

US 2002/0155012 A1 Oct. 24, 2002

(51) Int. Cl.[7] ............................. F04B 17/04; F04B 17/00
(52) U.S. Cl. .................... 417/417; 417/415; 310/12; 310/13
(58) Field of Search ................. 417/417, 415, 417/410.1, 423.14, 423.7, 44.1; 310/12, 13

(56) References Cited

U.S. PATENT DOCUMENTS

| 4,172,229 A | * 10/1979 | Guimbal | 310/13 |
| 4,812,884 A | 3/1989 | Mohler | |
| 5,233,140 A | 8/1993 | Asano et al. | |
| 5,280,775 A | 1/1994 | Tanamura et al. | |
| 5,503,364 A | * 4/1996 | Enomoto et al. | 251/129.02 |
| 6,127,750 A | * 10/2000 | Dadd | 310/13 |
| 6,323,568 B1 | 11/2001 | Zabar | |
| 6,540,485 B2 | * 4/2003 | Nara et al. | 417/415 |

FOREIGN PATENT DOCUMENTS

JP          62-112369          7/1987

* cited by examiner

Primary Examiner—Charles G. Freay
Assistant Examiner—Michael K. Gray
(74) Attorney, Agent, or Firm—G. E. Ehrlich (1995) Ltd.

(57) ABSTRACT

An electromagnetic device includes a core and a coil in the space between a central section and an outer section of the core and spaced inwardly of an open side of the core such that the coil is completely recessed within the core. An armature, facing and aligned with the recess in the core is being movable towards and away from the coil. A pair of springs on the opposite ends of the core, and coaxial with the longitudinal axis of the core, mount the armature for straight-line reciprocatory movements parallel to the longitudinal axis of the core such that during the movement of the armature: (a) a recess in the armature receives the central section of the core; (b) the outer surface of the armature defines a first working gap with the inner surface of the core outer section; (c) and the inner surface of the armature at the recess defines a second working gap with the outer surface of the core central section.

20 Claims, 9 Drawing Sheets

ELECTROMAGNETIC DEVICE PARTICULARLY USEFUL AS A VIBRATOR FOR A FLUID PUMP

FIELD AND BACKGROUND OF THE INVENTION

The present invention relates to electromagnetic devices. The invention is particularly useful as an electromagnetic vibrator for a fluid pump, and is therefore described below with respect to this application.

Electromagnetic devices include cores containing electrical coils which generate a circulating loop of magnetic flux producing an attractive force with respect to a movable armature, to convert the electrical current passed through the coil to mechanical movements of the armature. The strength of the circulating loop of magnetic flux, and therefore the strength of the force supplied to the armature, is determined by the coil size, current flow through the coil, magnetic permeability of the core, and the magnetic reluctance across the various air gaps.

Electromagnetic devices in general, and electromagnetic vibrators in particular, include two types of air gaps: a fixed air gap, namely one in which the distance between the relatively moving surfaces of the armature and core remains substantially the same; and a variable air gap, in which the distance changes during such movements. The force developed by an electromagnetic device is a function of the rate of change of the magnetic reluctance (or permeance) of the air gap. Accordingly, a fixed air gap does not contribute to the attractive force produced by the electromagnetic device; rather it reduces the strength of the circulating loop of magnetic flux through the core produced by a given current through the coil. Fixed air gaps are generally provided merely for manufacturing tolerances; they should therefore be as small as possible in order to minimize the power consumed by the device and the heat generated by the device.

Variable air gaps, on the other hand, which produce the attractive force between the fixed core and movable armature, should be designed to produce maximum force with respect to the armature during the movement of the armature for a given power consumption. Electromagnetic solenoids have been previously developed providing two variable air gaps in order to provide an increased operating force in the operating direction of the solenoid, for example as described in U.S. Pat. No. 4,812,884.

OBJECTS AND BRIEF SUMMARY OF THE PRESENT INVENTION

One object of the present invention is to provide a new and efficient electromagnetic device particularly useful as a vibrator, e.g., for operating a fluid pump, but also having features useful in other electromagnetic devices, such as solenoids. Another object of the invention is to provide a new and efficient electromagnetic vibrator particularly useful for driving a fluid pump.

According one aspect of the present invention, there is provided an electromagnetic device, comprising: a core of magnetically permeable material having a longitudinal axis, a central section coaxial with the longitudinal axis, an outer section spaced outwardly from the central section, and a bridging side section bridging the outer and central sections at one side of the core, the opposite side of the core being open; a coil in the space between the central and outer sections of the core and spaced inwardly of the open side of the core such that the coil is completely recessed within the core, and the outer and central sections of the core define an extension extending laterally past the recessed coil; a movable armature of magnetically permeable material facing and aligned with the extension in the core, the armature being movable towards and away from the coil and being formed with a central recess; and a pair of springs on the opposite ends of the core and coaxial with the longitudinal axis of the core, the pair of spring mounting the armature for straight-line reciprocatory movements parallel to the longitudinal axis of the core; the armature and its recess being configured and located such that during the movement of the armature towards and away from the coil: (a) the recess receives the central section of the core; (b) the outer surface of the armature defines a first working gap with the inner surface of the core outer section at the extension; (c) and the inner surface of the armature at the recess defines a second working gap with the outer surface of the core central section at the extension.

The first and second gaps referred above are referred to as "working gaps" since the distance between the respective surfaces defining each gap (and thereby the gap permeance or reluctance) changes during the operation of the device to produce the attractive force, or the work performed by the electromagnetic device. As described above, this is to be distinguished from fixed air gaps, which do not produce an attractive force and therefore are not "working gaps".

Several preferred embodiments of the invention are described below for purposes of example. According to further features in the described preferred embodiments, the armature is movable from an initial position with respect to the outer face of the core central section at the extension, to an inner position within the extension but outwardly of the respective end of the coil, and to an outer position outwardly of the outer face of the core central section at the extension.

In addition, in some described embodiments, the armature is mounted for the straight-line reciprocatory movements by a shaft coupled to the armature and extending through the core coaxially with the longitudinal axis of the core; whereas in another described embodiment, the armature is mounted for the straight-line reciprocatory movements by a shuttle member coupled to the springs on opposite sides of the core for reciprocatory movement parallel to the longitudinal axis of the core.

In a further described embodiment the electromagnetic device includes a plurality of cores, coils and armatures arranged in tandem with all the armatures coupled together to produce a powerful, compact electromagnetic vibrator (or other electromagnetic devices such as a solenoid).

In all the described embodiments, the coil is energized by an alternating current source having a half-wave rectifier effective to energize the coil in half-cycles to drive the armature in one direction, and to de-energize the coil in the remaining half-cycles to permit the pair of springs to drive the armature in the opposite direction.

As will be described more particularly below, electromagnetic devices incorporating the foregoing features may be constructed as compact units producing large mechanical forces for the electrical power consumed, and generating small amounts of heat for the mechanical force generated.

Further features and advantages of the invention will be apparent from the description below.

BRIEF DESCRIPTION OF THE DRAWINGS

The invention is herein described, by way of example only, with reference to the accompanying drawings, wherein.

The Vibrator of FIGS. 1–5

Figure 1:
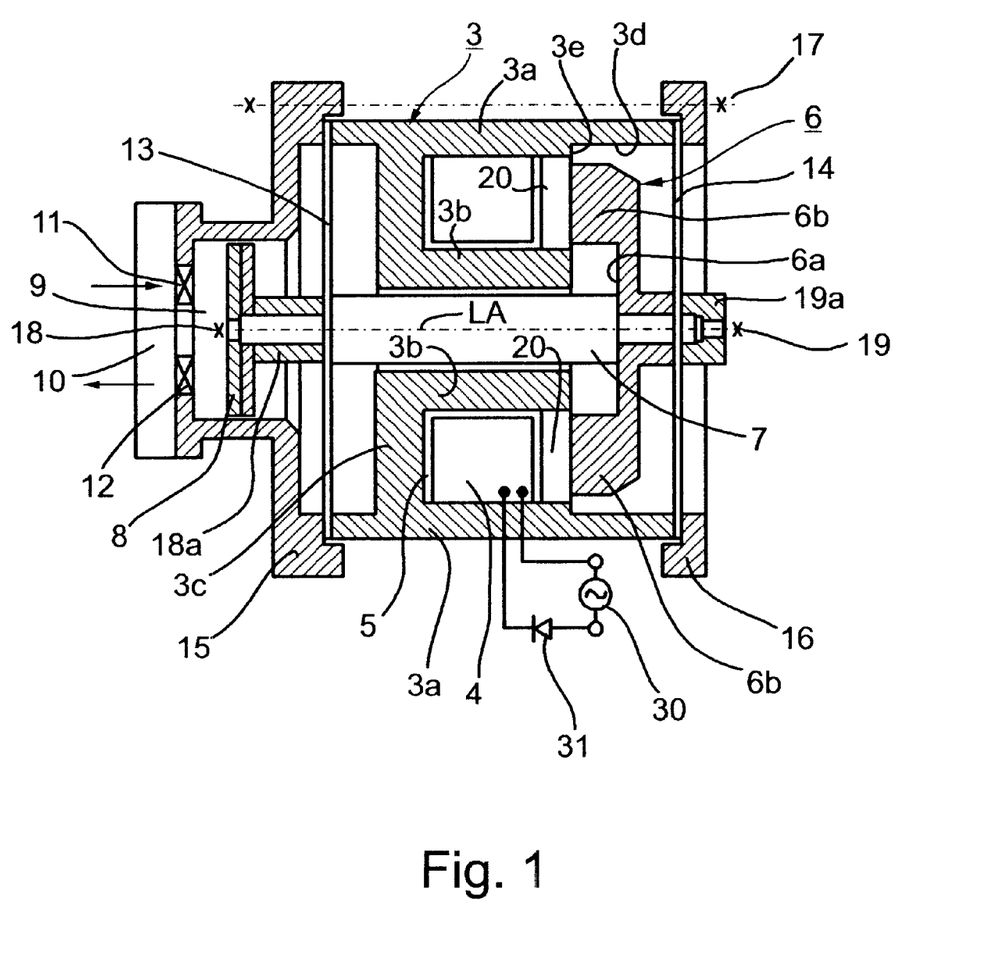
FIG. 1 is a sectional view of one form of electromagnetic vibrator constructed in accordance with the present invention.

FIGS. 1–5 illustrate an electromagnetic device, particularly a vibrator, of a cylindrical configuration constructed in accordance with the present invention. The basic elements of the vibrator of FIGS. 1–5 are shown in FIG. 1.

Thus, as shown FIG. 1, the vibrator, includes: a core 3 of magnetically permeable material; a coil 4 wound on a bobbin 5 fixed within the core 3; and an armature 6 of magnetically permeable material mounted for bi-directional reciprocatory movement towards and away from one end face of the core 3.

The bi-directional movements of the armature 6 are transmitted by a shaft 7 passing through the core 3 to a piston 8 at the opposite side of the device. Piston 8 is movable within a cylinder chamber 9 defined by a head cover including one-way valve 11 allowing air to pass into chamber 9, and another one-way 12 valve allowing air to pass out of the chamber, so that the reciprocations of the piston 8 produce an air pumping action.

Armature 6 and its shaft 7 are supported for bi-directional movement by a pair of a flat elastic springs 13, 14, of disc configuration at the opposite sides of core 3 and connected to the core by a pair of side plates 15, 16 secured together by axially extending tie rods or long screws 17.

Piston 8 is secured to one end of shaft 7 by a fastener 18 which passes through the piston, a spacer 18a, and the respective flat spring 13 at that side of the core. The opposite end of shaft 7 is secured to flat spring 14 by another fastener 19 passing through it and an outer collar 19a.

As particularly shown in FIG. 1, the core 3 of magnetically permeable material has a longitudinal axis LA, an outer section 3a of cylindrical configuration coaxial with axis LA; a central section 3b coaxial with axis LA, spaced from the outer section 3a, and also of cylindrical configuration; and a side section 3c, perpendicular to axis LA, bridging the other cylindrical section 3a and the central cylindrical section 3b at one side of the core (left side, FIG. 1). The opposite side (right side, FIG. 1) of the core is not bridged, but rather is left open. The end of the right side of the core 3 is of reduced thickness, as shown at 3d, to define an inner annular shoulder 3e spaced inwardly of the respective side of the core. The face of the central section 3b of the core at that side is flush with annular shoulder 3e formed in the outer section 3a of the core.

The core 3 and armature are preferably of a sintered metal powder to reduce eddy currents. Particularly good results were obtained when the sintered metal powder was "SOMA-LOY" (T M) 500, obtainable from Hoganas, of Sweden.

As shown in FIG. 1, the coil 4 and its bobbin 5 are both spaced inwardly of the open side of the core, and of its inner annular shoulder 3e, so as to be completely recessed within the core. That is, coil 4 and bobbin 5 define an annular recess, shown as 20 in FIG. 1, between the bobbin 5 and the inner annular shoulder 3e of the core 3 in the extension of the core outwardly of the coil 4 and its bobbin 5.

The movable armature 6 faces and is aligned with the extension defining the annular recess 20 within core 3. Armature 6 is movable towards and away from the coil 4 and its bobbin 5 inwardly and outwardly of the annular recess 20. The outer diameter of armature 6 is slightly less than the inner diameter of the outer core section 3a at the annular recess 20. The armature is formed with a central recess 6a of slightly larger diameter than the outer diameter of the central core section 3b to define an outer annular section 6b of the armature receivable within the annular recess 20 of the core 3 during the reciprocatory movement of the armature.

Coil 4 is energized by a source of alternating current 30 having a half-wave rectifier 31 effective to energize the coil in half-cycles to drive the armature 6 in one direction, and to de-energize the coil in the remaining half-cycles to permit the pair of flat springs 13, 14 to drive the armature in the opposite direction.

Figure 2A:
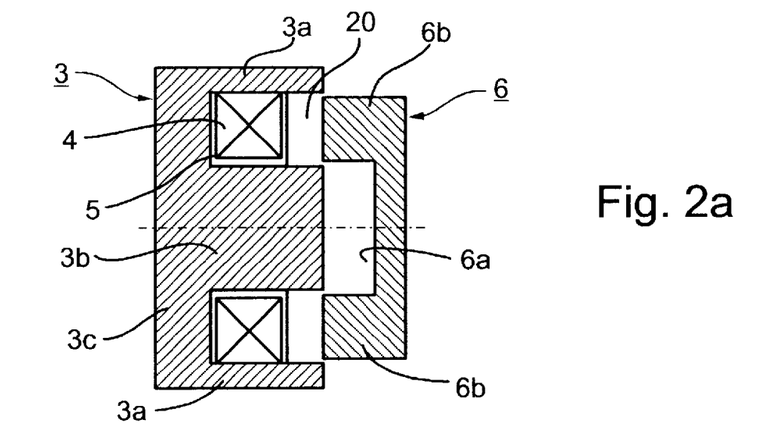
FIGS. 2a, 2b and 2c illustrate the reciprocatory movements of the armature with respect to the core in the vibrator of FIG. 1.
Figure 2B:
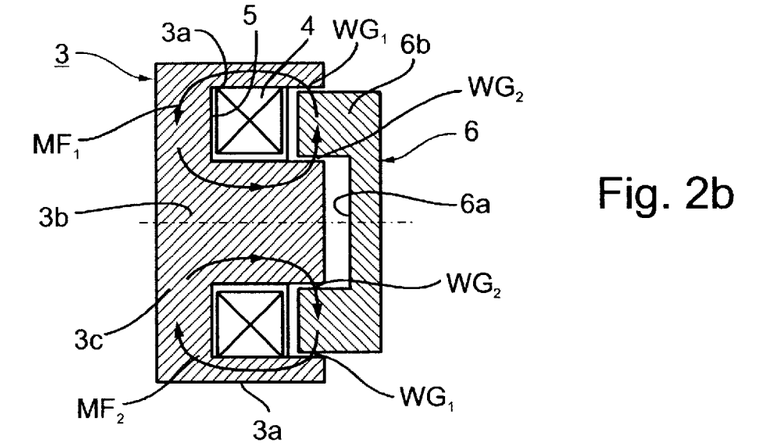
Figure 2C:
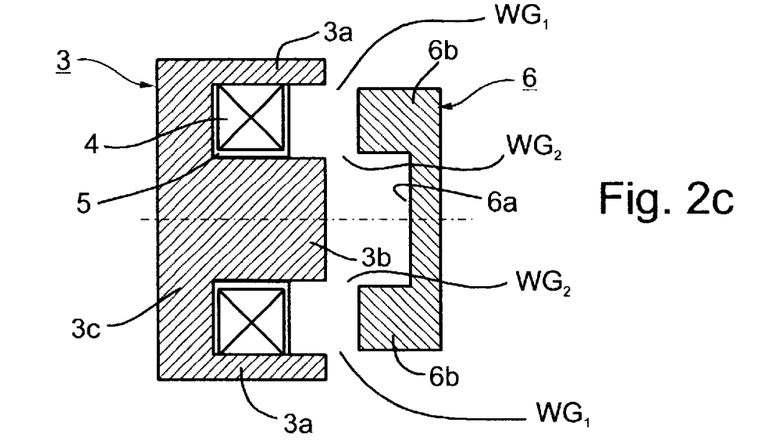

The operation of the vibrator FIG. 1 will be better understood by referring to FIGS. 2a–2c illustrating the three positions of the armature 6 with respect to the core 3, as the armature is driven by the coil during one-half of each cycle, and in the opposite direction by the flat springs 13, 14, during the other half of each cycle, through straight-line reciprocatory movements parallel to the longitudinal axis LA of the core 3.

FIG. 2a illustrates the initial or normal position (i.e., at the working point) of the armature, also shown in FIG. 1, when coil 4 is deenergized. In this initial position of the armature 6 as illustrated in FIG. 2a, the outer annular section 6b of the armature is aligned with the annular recess 20 defined by the outer core section 3a, the central core section 3b, the recessed coil 4 and its bobbin 5.

FIG. 2a illustrates this initial position of the armature as being substantially flush with the outer face of the central core section 3b. However, this depends on the working point of the electromagnetic device. In some applications the initial position of the armature may be slightly inwardly, and in other applications slightly outwardly, of the outer face of central core section 3b.

FIG. 2b illustrates the maximum inner position of the armature with respect to the core; and FIG. 2c illustrates the maximum outer position of the armature with respect to the core.

As best seen in FIG. 2b, the outer surface of the armature annular section 6b which, as described earlier, is of only slightly smaller diameter than the inner diameter of the core outer section 3a, defines a first working gap $WG_1$ with the inner surface of the outer section 3a of the core. Similarly, the inner surface of the armature annular section 6b, bordering the central recess 6a for accommodating the core central section 3b, defines a second working gap $WG_2$ with the outer surface of the core central section 3b. Both gaps $WG_1$, $WG_2$ are working gaps, in the sense that they change in dimension during the bi-directional, reciprocatory movements, of the armature 6, and thereby contribute to the attractive force produced by the magnetic flux flowing through the core 3. In this embodiment both working gaps $WG_1$, $WG_2$ are of annular configuration.

As also best seen in FIG. 2b, there are two magnetic flux loops $MF_1$, $MF_2$ through the core 3 and armature 6. Each loop includes the two gaps $WG_1$, $WG_2$. Both gaps change in length during the movement of the armature 6 as shown in FIGS. 2a and 2c, and therefore serve as working gaps contributing an attractive force with respect to the armature. The provision of two working gaps in each circulating loop of magnetic flux maximizes the mechanical force produced by the device for the electrical power consumed.

It will thus be seen that in the initial position of armature 6, as illustrated in FIG. 2a, the electromagnetic force applied to the armature is at a maximum, whereas the spring force applied to the armature is at a minimum. As the armature moves inwardly within recess 20, the electromagnetic force decreases because of magnetic saturation, whereas the spring force increases by the loading of the spring, until the innermost position of the armature is reached, as shown in FIG. 2b, wherein the electromagnetic force is minimum and the spring force is maximum. The spring force then moves the armature outwardly to the outermost position shown in FIG. 2c. Here again the spring force is maximum tending to move the armature back towards the recess 20 to the initial position illustrated in FIG. 2a, wherein the spring force is minimum but the electromagnetic force is maximum. The electromagnetic force thus complements the spring force to produce an efficient reciprocity movement of the armature.

It will also be seen that the reciprocatory movements of the armature 6 are straight-line movements parallel to the longitudinal axis LA of the core 3. Such straight line reciprocatory movements produce a more efficient pumping action than angular movements resulting from a pivotally-mounted armature, thereby further maximizing the mechanical force produced by the device for the electrical power consumed.

It will be further seen that since the coil 4 and its bobbin 5 are both fixed in core 3 and recessed with respect to the side of that core facing the armature 6, it is not necessary to provide fixed gaps, i.e., gaps which do not change in length during the movement of the armature 6. As indicated earlier, such fixed, or non-working, gaps are generally provided in electromagnetic devices to accommodate manufacturing tolerances with respect to relatively movable surfaces. Since the structure illustrated in FIGS. 1 and 2a–2c eliminates the need for fixed gaps, it minimizes the fringe flux, that is, flux lines which do not pass through a working gap. As result, the illustrated construction eliminates the energy loss associated with driving flux through a non-working gap, thereby minimizing power consumption as well as heat generation. Further, the absence of an air space (a non-working gap) between the coil and the core produces better heat dissipation of the heat generated in the coil.

A further advantage is that, since no fixed (non-working) gap is required between the coil of the core and the armature, the coil may be of smaller diameter for the same number of turns, thereby decreasing the overall length of the coil wire; alternatively the wire diameter may be slightly increased for the same overall diameter of the core. Either case enables the resistance of the coil wire to be reduced, thereby further contributing to the reduction in the power consumed and the heat generated.

In addition, non-working gaps (as generally provided in the existing electromagnetic devices in order to accommodate manufacturing tolerances with respect to relatively movable surfaces during the operation of the armature) tend to produce undesirable side forces according to the degree of eccentricity with respect to the relatively movable surfaces. Since non-working gaps are not needed in the above-described construction illustrated in FIGS. 1 and 2a–2c, such side forces may be substantially eliminated, so that the electromagnetic device operates more efficiently and with less wear of the parts thereby, contributing to longer life.

Figure 3:
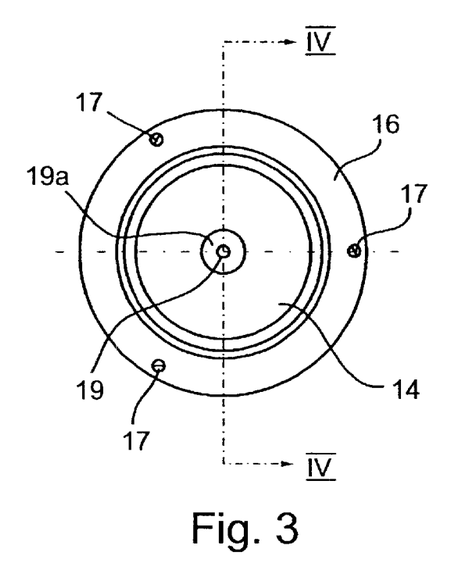
FIG. 3 is an end view illustrating an electromagnetic vibrator constructed basically according to the embodiment illustrated in FIG. 1.
Figure 4:
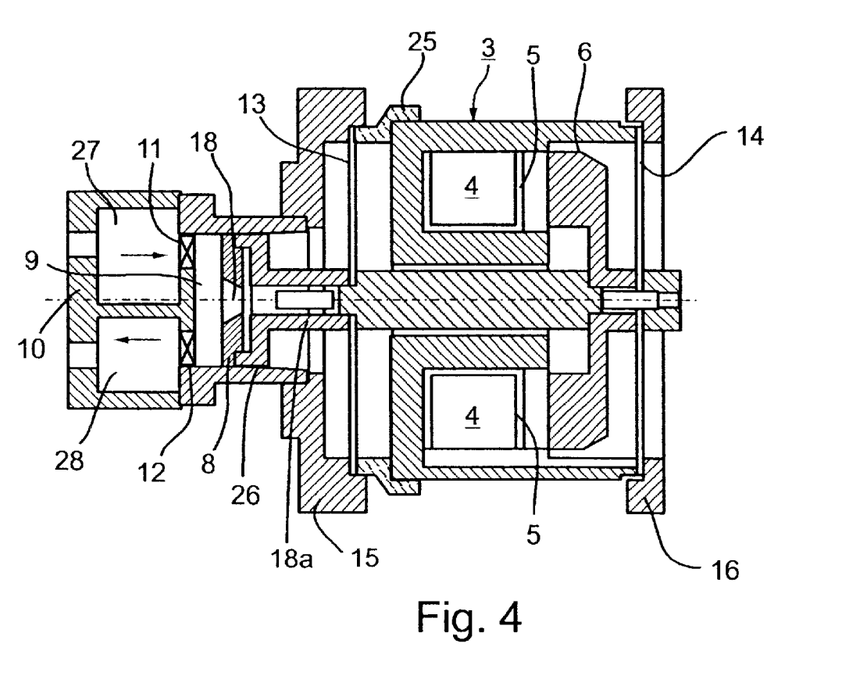
FIG. 4 is a sectional view along line IV—IV of FIG. 3.

FIGS. 3 and 4 illustrate an electromagnetic vibrator constructed as described above with respect to FIG. 1 but modified for production. To facilitate understanding, the same reference numerals have been used for identifying the corresponding parts in FIG. 1.

Figure 5:
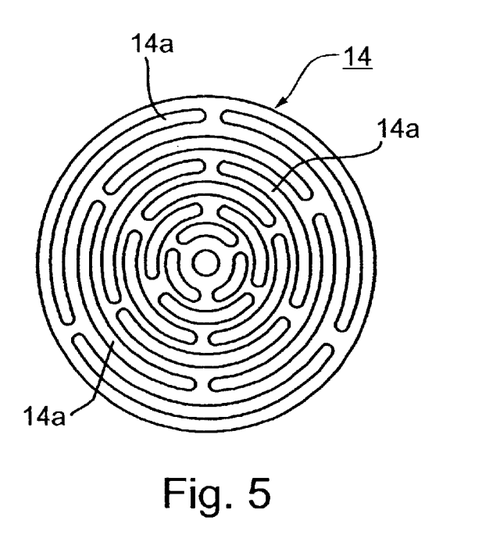
FIG. 5 is a plan view illustrating one of the flat springs in the vibrator of FIGS. 1–4.

FIG. 5 illustrates the construction of each of the flat springs 13, 14, provided at the opposite sides of the shaft 7 for supporting the shaft and the armature 6 with respect to the core 3. As seen in FIG. 5, each flat spring (e.g. 14) is made of elastic sheet material of a circular disc shape and formed with a plurality of coaxial, circular arrays of closed, elongated curved slots 14a to impart axial flexibility while providing transverse (radial) stiffness.

The main differences in the construction illustrated in FIGS. 3–5, compared to that illustrated in FIG. 1, is the provision of collar 25 at one side of the core 3 with the flat disc spring 13 clamped between it and the side plate 15, and the provision of an annular flange 26 around the outer end of spacer 18a for clamping the piston 8 thereto by the fastener 18.

FIG. 4 also illustrates an air inlet chamber 27 (to reduce noise) for inletting air into the pumping chamber 9 via one-way valve 11, and an air outlet chamber 28 for outletting the air pumped out of the chamber via one-way valve 12.

In all other respects, the electromagnetic vibrator illustrated in FIGS. 3–5 is constructed and operates as described above with respect to FIGS. 1 and 2a–2c.

Figure 6:
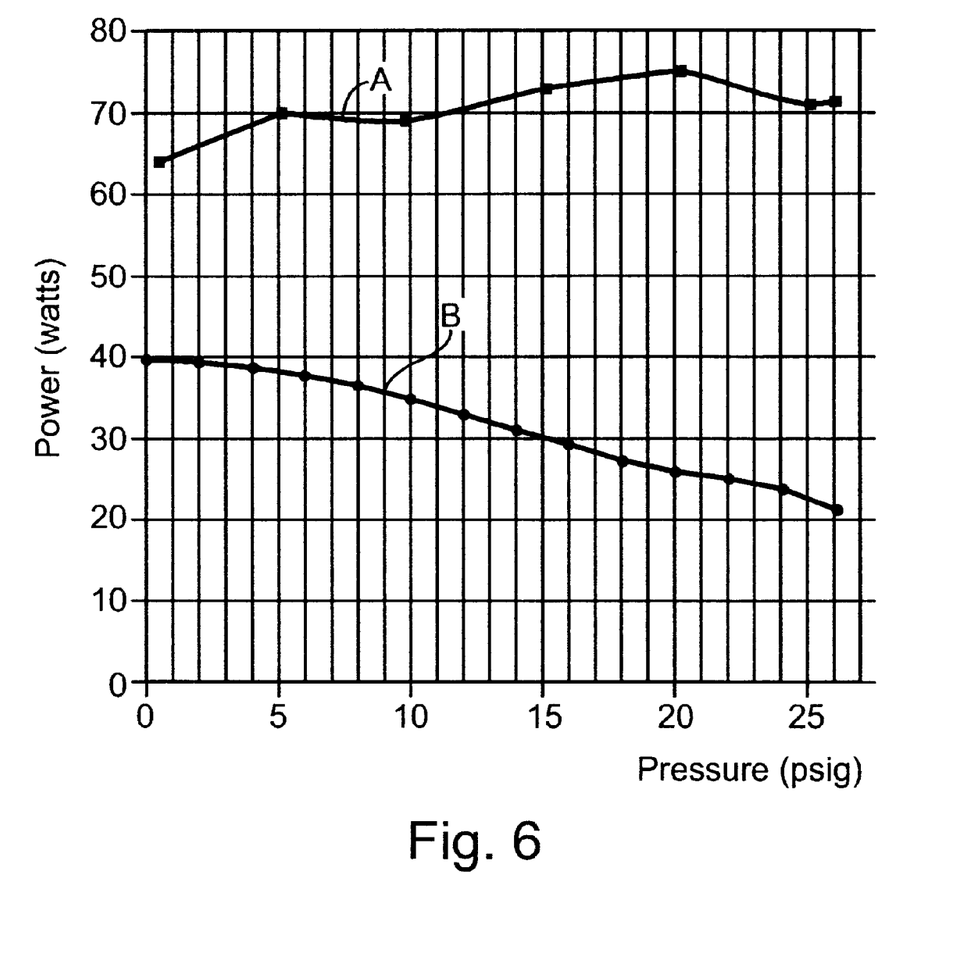
FIG. 6 illustrates the results of tests performed on the electromagnetic vibrator construction of FIGS. 1–4 as compared to a conventional electromagnetic vibrator used as an air pump in a commercial nebulizer.

Comparative Test Data (FIG. 6)

An electromagnetic vibrator as described above was used as the air compressor in a commercially-available nebulizer, and the power consumption vs. pressure characteristics were compared to those of the conventional compressor in the commercially-available nebulizer. The results are shown in FIG. 6.

In FIG. 6, the upper curve A represents the power consumption vs. pressure for the conventional compressor used in this nebulizer, wherein it will be seen that the power consumption varies from about 65 watts to about 75 watts for the pressure range of 0–25 psig. Lower curve B illustrates the power consumption vs. pressure when the compressor was of the novel construction as described above, wherein it will be seen that the power consumed was about 40 watts at the low-pressure end of this pressure range, and was even further reduced to about 20 watts as the pressure increases. FIG. 6 thus clearly show the higher operating efficiency obtainable by electromagnetic vibrators constructed as described above.

Figure 7:
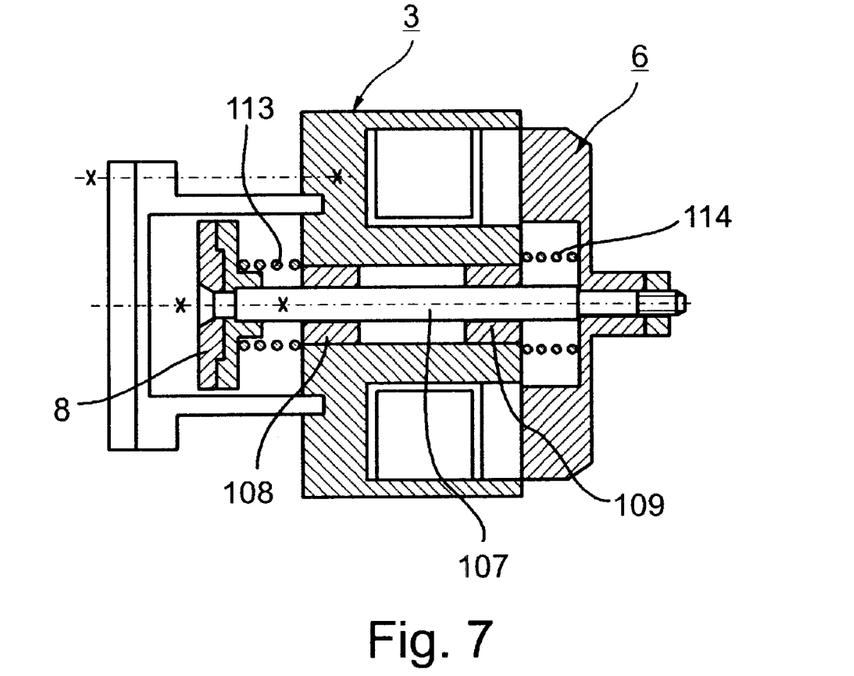
FIG. 7 is a sectional view illustrating another electromagnetic vibrator constructed in accordance with the present invention.
Figure 8:
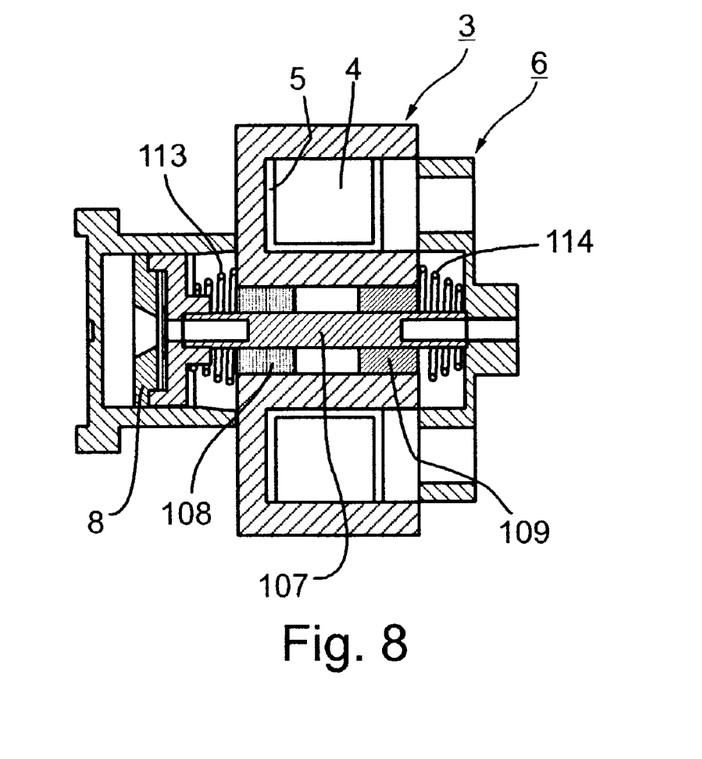
FIG. 8 is a sectional view more particularly illustrating the structure of the vibrator of FIG. 7.

The Electromagnetic Vibrator of FIGS. 7 and 8

FIGS. 7 and 8 are views corresponding to FIGS. 1 and 4, respectively, illustrating another electromagnetic vibrator constructed in accordance with the present invention. The electromagnetic vibrator illustrated in FIGS. 7 and 8 is generally similar to that described above, and therefore to facilitate understanding, the corresponding elements are identified by the same reference numerals.

The basic difference in the construction of the vibrator of FIGS. 7 and 8 is that instead of mounting the shaft 7 and the armature 6 by a pair of flat springs (13, 14), at the opposite sides of the core 3, in the construction illustrated in FIGS. 7 and 8 the shaft, designated 107, is slidably mounted within the core 3 by a pair of slide bearings 108, 109 and is urged to its normal position by a pair of coil springs 113, 114.

Such a construction is less expensive since it eliminates the need for flat springs and the side plates 15 and 16. In all other respects, the electromagnetic vibrator of FIGS. 7 and 8 is constructed and operates as described above with respect to FIGS. 1–6.

Figure 9:
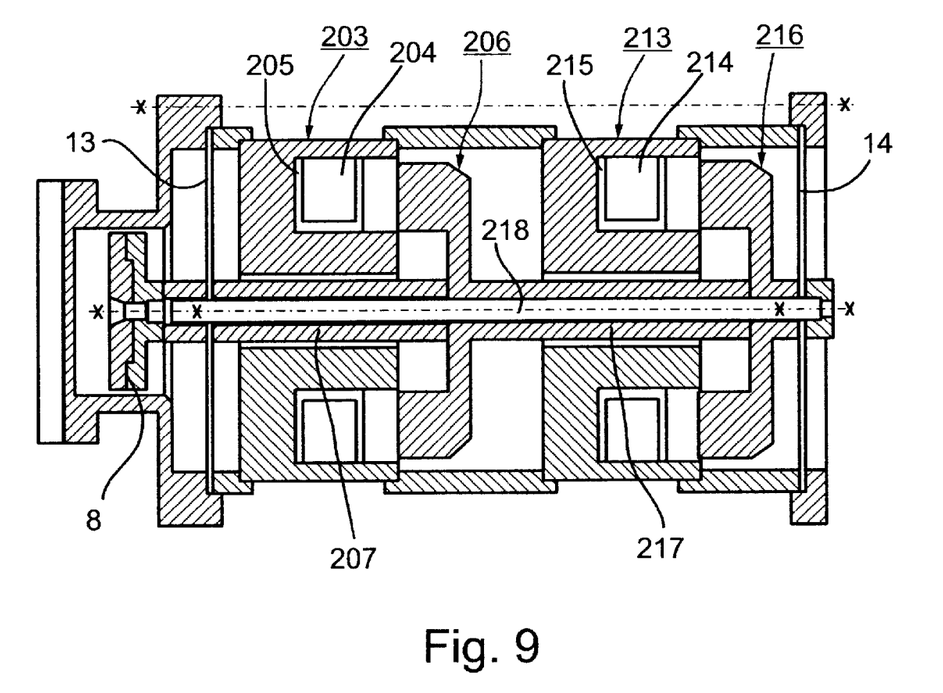
FIG. 9 is a sectional view illustrating a third electromagnetic vibrator constructed in accordance with the present invention.

The Electromagnetic Vibrator of FIG. 9

FIG. 9 illustrates an electromagnetic vibrator also constructed and operated substantially as described above with respect to FIGS. 1–6, except that the vibrator includes a plurality of cores, coils, and armatures in a tandem relationship on a common shaft. FIG. 9 illustrates two such sets of components in tandem relationship, but it will be appreciated that more than two could be provided if desired. Thus, as shown in FIG. 9, one set of components includes core 203 and coil 204, bobbin 205, armature 206, and sleeve 207, in tandem relationship with respect to another set of such components including core 213, coil 214, bobbin 215, armature 216 and sleeve 217. The two sleeves 207, 217, are aligned with each other, and fixed to a common shaft 218, which is coupled to the common piston 8. This complete assembly is mounted between two flat springs 13, 14.

Figure 10:
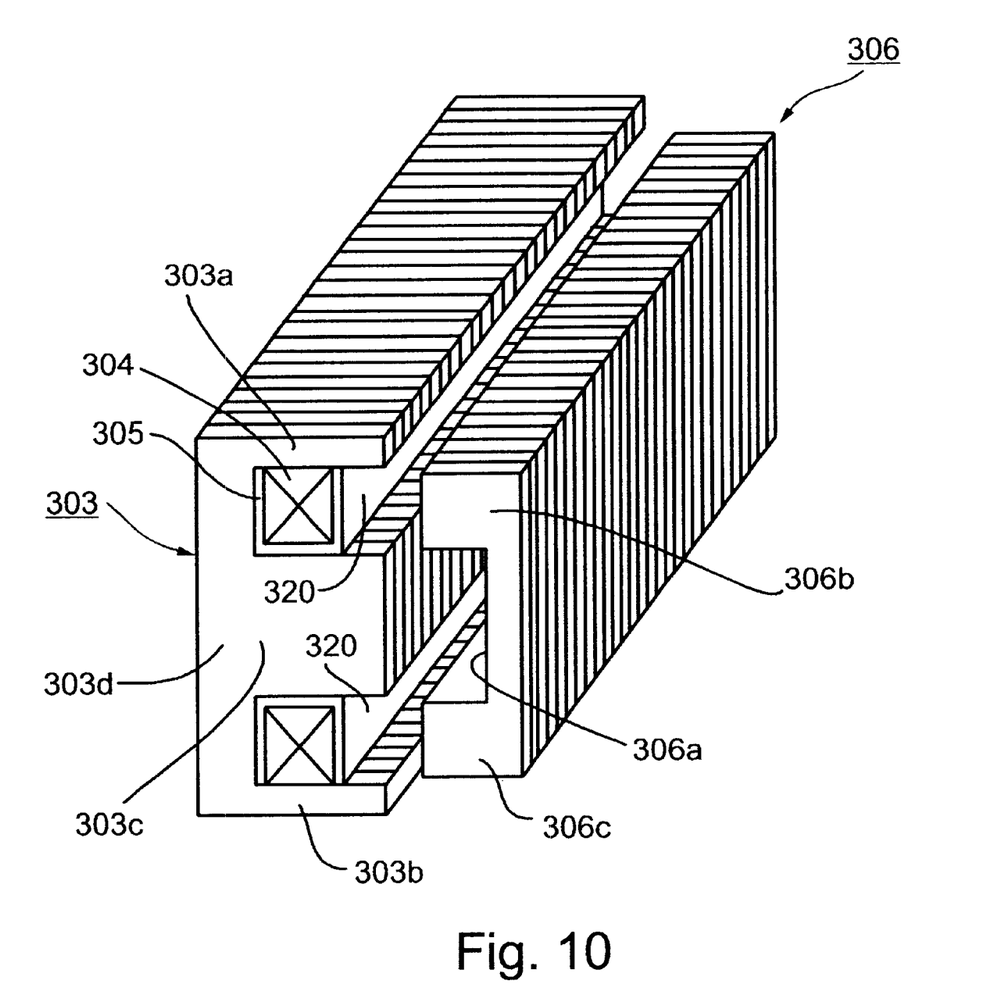
FIG. 10 is a three dimensional view illustrating the core, coil and armature of a fourth electromagnetic device constructed in accordance with the present invention.
Figure 11:
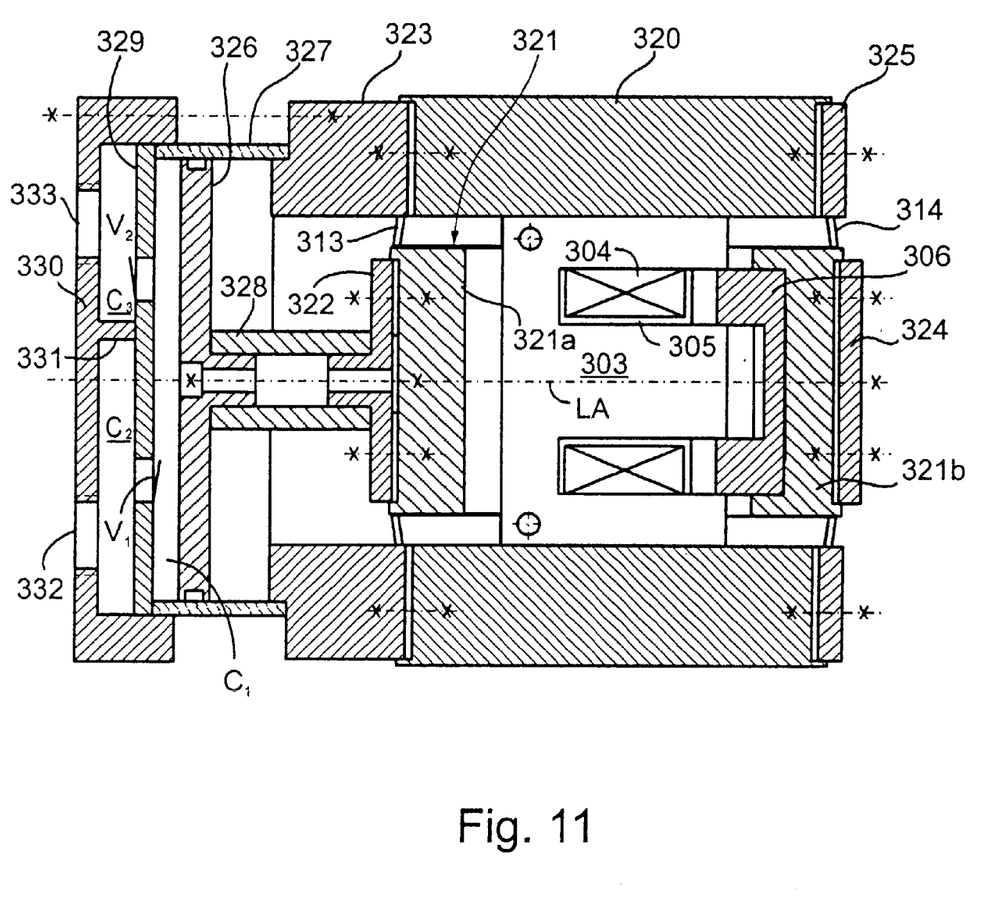
FIG. 11 is a sectional view illustrating the electromagnetic device of FIG. 10 including one manner of coupling the straight-line reciprocatory movements of the armature to a driven device, particularly to a fluid pump.
Figure 12:
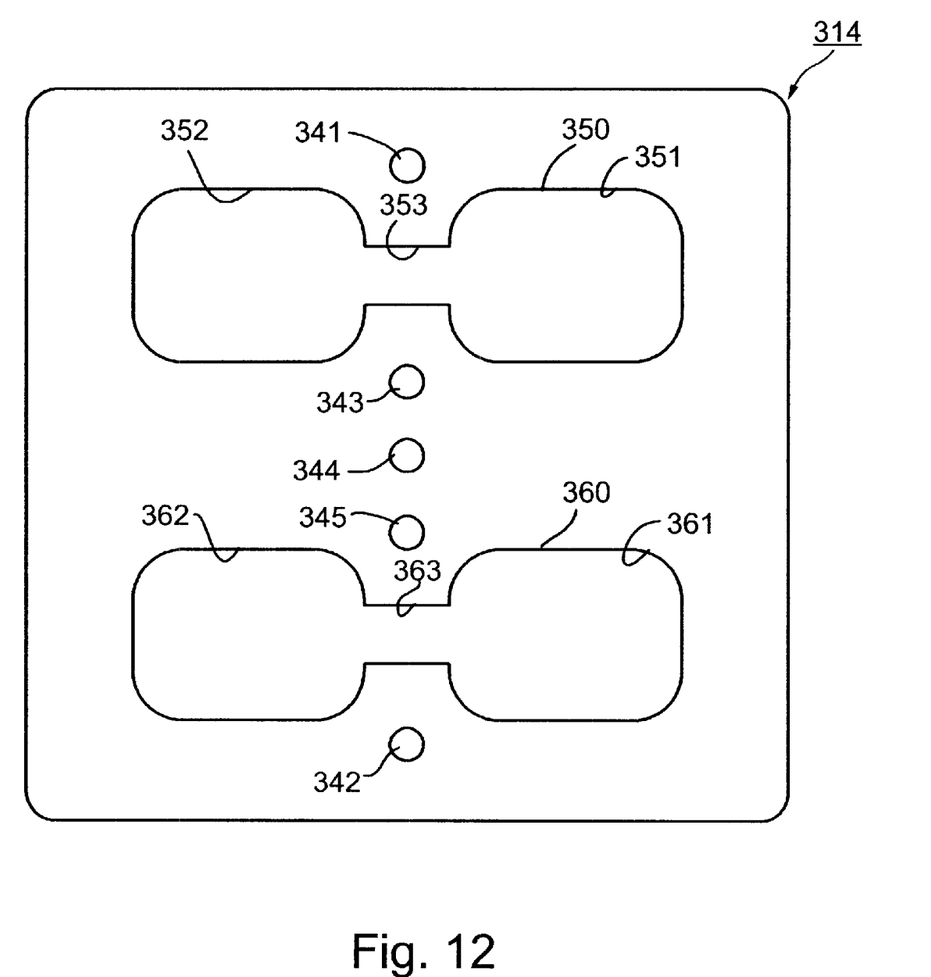
FIG. 12 illustrates one of the flat springs in the electromagnetic device of FIG. 11.

The Electromagnetic Vibrator of FIGS. 10–12

In the electromagnetic vibrators described earlier, the core and armature are of a cylindrical configuration such that the two working gaps are both of annular configuration. FIGS. 10–12 illustrate another implementation of the invention wherein the core and armatures are of a non-cylindrical configuration such that the two working gaps are both of planar configuration. Also, the core and the armature are made of laminations of magnetically permeable sheets, rather than of sintered metal particles, to reduce eddy currents. Electromagnetic devices constructed with laminated cores and armatures, as better permitted by the embodiment illustrated in FIGS. 10–12, enable higher-strength magnetic fields to be generated within the core for the electrical power consumed.

As shown in FIG. 10, the core, therein designated 303, is of E-configuration, defining three parallel legs 303a, 303b, 303c joined together at one side by a bridging leg 303d. The coil 304 and its bobbin 305 are located in the spaces between the middle leg 303c and the two end legs 303a, 303b respectively. Thus the middle leg 303c corresponds to the central section 3b of the core 3 illustrated in FIG. 1, whereas the two end legs 303a, 303b correspond to the outer core section 3a in FIG. 1. The coil 304 and bobbin 305 are spaced inwardly of the open side of the core such that the coil is completely recessed within the core, to produce a recess 320 correspondent to recess 20 in FIG. 1.

The armature 306 in FIG. 10 is constructed with a central recess 306a to accommodate the middle leg 303c of the core 303, and thereby to define an outer leg 306b, 306c, at each of its opponent ends. The armature 306 is mounted for similar straight-line reciprocatory movements as described above within the two recesses of the core 303 receiving the coil 304 and bobbin 305.

Thus, the outer surface of armature leg 306b defines a first working gap (corresponding to $WG_1$, FIG. 2b) with respect to the adjacent surface of the core 303, and the inner surface of armature leg 306b defines a second working gap (corresponding to $WG_2$, FIG. 2b) with respect to adjacent surface of the core. The opposite side of the armature forms two similar working gaps $WG_1$, $WG_2$, in the same manner as described above with respect to FIG. 1, except that, whereas in the FIG. 1 there are two working gaps of annular configuration, in FIG. 10 there are two pairs of working gaps of straight or planar configuration.

FIG. 11 illustrates one manner of mounting the armature 306 for straight-line reciprocatory movements parallel to the longitudinal axis LA of the core 303 by the use of two flat springs 313, 314; and FIG. 12 illustrates an example of the construction of one of such flat springs.

As shown in FIG. 11, the core 303 is mounted centrally of a holder 320, whereas the armature 306 is mounted for reciprocatory movements with respect to the core 303 by the two flat springs 313, 314 and a shuttle 321. Shuttle 321 is preferably of a C-configuration (but may also be of a U-configuration) straddling the opposite end of the core and armature, and providing a space for the reciprocations of the armature 306 with respect to the core 303 and its holder 320.

Thus, shuttle 321 includes a leg 321a at one side of the core 303 fixed to the holder 320 by an inner clamping plate 322 clamping the inner portion of flat spring 313 to leg 321a, and an outer clamping plate 323 clamping the outer portion of the flat spring 313 to the holder 320. Shuttle 321 also includes a second leg 321b at the opposite side of the core 303 engageable with the armature 306. Leg 321b is clamped to the inner portion of flat spring 314 by an inner clamping plate 324, whereas the outer portion of flat spring 314 is clamped to the holder 320 by an outer clamping plate 325.

The reciprocatory movements of the armature 306 are transmitted to a piston 326 movable within a cylinder 327 by the shuttle 321 and a spacer sleeve 328 coupled between the inner clamping plate 322 and the piston 326. Cylinder 327 is closed by an end wall 329 to define a chamber $C_1$ between piston 326 and end wall 329. End wall 329 is provided with a one-way valve $V_1$ which permits air to enter chamber $C_1$ and a second one-way valve $V_2$ which permits air to exit from the chamber $C_1$. A cover 330 is fixed to the outer clamping plate 323 to enclose cylinder 327 but to be spaced from its end plate 329. Cover 330 is formed with a partition 331 engageable with end plate 329, and with openings 332 and 333 on opposite sides of the partition 331. Cover 330 thus defines a noise-reducing inlet chamber $C_2$ communicating with pumping chamber $C_1$ via the inlet valve $V_1$, and a noise-reducing outlet chamber $C_3$ communicating with the pumping chamber C1 via the outlet valve $V_2$.

FIG. 12 illustrates the construction of flat spring 314 coupling the armature 306 to the holder 320 and core 303 for reciprocatory movements of the armature with respect to the core, it being appreciated that the other flat spring 313 is of the same construction. Thus, as shown in FIG. 12, flat spring 314 is of rectangular configuration. It is formed with two outer holes 341, 342 at its opposite sides for fixing to holder 320 via the outer clamping plate 325, and with three inner holes 343, 344, 345, for fixing to leg 321b of shuttle 321 via the inner clamping plate 324. Flat spring 314 is further formed with cut-outs at its opposite ends as shown at 350 and 360, respectively. Each cut-out includes a pair of elongated holes 351, 352 and 361, 362, interconnected by a narrow juncture 353, 363. Such a construction permits a high degree of axial flexibility while providing transverse stiffness.

The straight-line reciprocatory movements of armature 306 are thus translated by shuttle 321 and the two flat springs 313, 314, to straight-line reciprocatory movements of the piston 326 parallel to the longitudinal axis LA of the core 303.

It will be seen that the construction in FIGS. 10–12 also enables the electromagnetic vibrators to be constructed only with working gaps, producing a maximum attractive force with minimum consumption of electrical power, as described above with respect to FIGS. 1–9, and particularly as shown in the comparative data of FIG. 6.

While the invention has been described with respect to several preferred embodiments, it will be appreciated that these are set forth merely for purposes of example, and that many variations and other applications of the invention may be made. For example, other configurations of cores and armatures could be provided, such as oval configurations rather than cylindrical or planar configurations. Also, the invention could be included in other types of electromagnetic devices, such as solenoids. Further, the piston or other driven device could be coupled to the same end of the shaft as the armature. Many other variations, modifications and applications of the invention will be apparent to those skilled in the art.

What is claimed is:

1. An electromagnetic device, comprising:
    a core of magnetically permeable material having a longitudinal axis, a central section coaxial with said longitudinal axis, an outer section spaced outwardly from said central section, and a bridging side section bridging the outer and central sections at one side of the core, the opposite side of the core being open;
    a coil in the space between said central and outer sections of said core and spaced inwardly of the open side of the core such that the coil is completely recessed within the core, and the outer and central sections of the core define an extension extending laterally past the recessed coil;
    a movable armature of magnetically permeable material facing and aligned with said extension in the core, said armature being movable towards and away from said coil and being formed with a central recess;
    and a pair of springs on the opposite ends of said core and coaxial with the longitudinal axis of the core, said pair of spring mounting said armature for straight-line reciprocatory movements parallel to said longitudinal axis of the core;
    said armature and its recess being configured and located such that during the movement of the armature towards and away from the coil:
        (a) the recess receives said central section of the core;
        (b) the outer surface of the armature defines a first working gap with the inner surface of the core outer section at said extension;
        (c) and the inner surface of the armature at said recess defines a second working gap with the outer surface of the core central section at said extension.

2. The electromagnetic device according to claim 1, wherein said armature is movable from an initial position with respect to the outer face of said core central section at said extension, to an inner position within said extension but outwardly of the respective end of said coil, and an outer position outwardly of the outer face of said core central section at said extension.

3. The electromagnetic device according to claim 2, wherein said initial position of the armature is substantially flush with the outer face of said core central section at said extension.

4. The electromagnetic device according to claim 1, wherein said pair of springs are flat springs flexible in the axial direction and stiff in the transverse direction to permit said straight-line reciprocatory movements of the armature.

5. The electromagnetic device according to claim 1, wherein said pair of springs are coil springs and cooperate with slide bearings to permit said straight-line reciprocatory movements of the structure.

6. The electromagnetic device according to claim 1, wherein said armature is mounted for said straight-line reciprocatory movements by a shaft coupled to said armature and extending through said core coaxially with said longitudinal axis of the core.

7. The electromagnetic device according to claim 1, wherein said armature is mounted for said straight-line reciprocatory movements by a shuttle member coupled to said springs on opposite sides of said core for reciprocatory movement parallel to said longitudinal axis of the core.

8. The electromagnetic device according to claim 1, wherein said core and armature are of a cylindrical configuration such that said first and second working gaps are both of annular configuration.

9. The electromagnetic device according to claim 1, wherein said core and armature are of a non-cylindrical configuration and said first and second working gaps are both of planar configuration.

10. The electromagnetic device according to claim 1, wherein a shaft connects said armature to a driven device to be driven by the electromagnetic device.

11. The electromagnetic device according to claim 10, wherein said shaft and armature are mounted for bi-directional movement within said core by a pair of flat springs yieldable in the axial direction of the shaft and stiff in the transverse direction of the shaft.

12. The electromagnetic device according to claim 10, wherein said shaft and armature are mounted for bi-directional movement within said core by slide bearings and are urged to an initial position by coil springs at the opposite ends of the shaft.

13. The electromagnetic device according to claim 10, wherein said device includes a plurality of said cores, coils and armatures in tandem relation, with all the armatures coupled together and to said driven device.

14. The electromagnetic device according to claim 1, wherein said core is made of laminations, and said armature is coupled to a driven device by a shuttle member coupled to said springs on opposite sides of said core for reciprocatory movement parallel to said longitudinal axis of the core.

15. The electromagnetic device according to claim 1, wherein said coil is energized by an alternating current source having a half-wave rectifier effective to energize the coil in half-cycles to drive the armature in one direction, and to de-energize the coil in the remaining half-cycles to permit said pair of springs to drive the armature in the opposite direction.

16. The electromagnetic device according to claim 1, wherein said armature is coupled to a driven member to drive the driven member through said straight-line reciprocatory movements parallel to said longitudinal axis of the core.

17. The electromagnetic device according to claim 16, wherein said driven member is a pumping member of a fluid pump.

18. The electromagnetic device according to claim 1, wherein said pair of springs mounting said armature for straight-line reciprocatory movement are flat springs each made of an elastic sheet material of a circular disc shape and formed with a plurality of coaxial, circular arrays of closed, elongated curved slots to impart axial flexibility while providing radial stiffness.

19. The electromagnetic device according to claim 18, wherein said armature is coupled to a piston movable within a chamber having a first one-way valve for inletting air into the chamber, and a second one-way valve for outletting air from the chamber.

20. An electromagnetic device, comprising:

a core of magnetically permeable material having a longitudinal axis;

a coil fixedly mounted within said core and having a longitudinal axis coaxial with that of said core;

an armature mounted for straight-line reciprocatory movement within said core along said longitudinal axis of the core;

a pair of springs mounting said armature for straight-line reciprocatory movement, each of said springs being a flat spring made of an elastic sheet material of a circular disc shape and formed with a plurality of coaxial, circular arrays of closed, elongated curved slots to impart axial flexibility while providing radial stiffness;

and a piston coupled to said armature and movable within a chamber having a first one-way valve for inletting air into the chamber, and a second one-way valve for outletting air from the chamber.

\* \* \* \* \*